United States Patent
Nadkarni et al.

(10) Patent No.: US 6,376,036 B1
(45) Date of Patent: Apr. 23, 2002

(54) AIR CONDITIONING HOSE

(75) Inventors: Pradeep Dattatraya Nadkarni, DeForest, WI (US); John Patrick Thomas, Bath, OH (US); Thomas Alan Brown, Sun Prairie, WI (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/048,482

(22) Filed: Mar. 26, 1998

(Under 37 CFR 1.47)

(51) Int. Cl.⁷ ............... B29D 23/24; B32B 1/08; F16L 11/08
(52) U.S. Cl. ............ 428/36.2; 138/125; 428/36.9; 428/474.4; 428/474.9; 428/476.9
(58) Field of Search ............... 428/36.9, 474.4, 428/474.9, 476.9, 36.2; 138/125

(56) References Cited

U.S. PATENT DOCUMENTS

| 4,633,912 A | | 1/1987 | Pilkington et al. ......... 138/132 |
| 4,862,923 A | | 9/1989 | Kitami et al. ............ 138/125 |
| 4,880,036 A | | 11/1989 | Kitami et al. ............ 138/137 |
| 4,907,625 A | | 3/1990 | Ito et al. ............... 138/126 |
| 4,950,436 A | * | 8/1990 | Kitami et al. ............ 264/103 |
| 5,016,675 A | * | 5/1991 | Igarashi et al. ........... 138/125 |
| 5,084,314 A | * | 1/1992 | Igarashi et al. ........... 428/36.2 |
| 5,223,571 A | | 6/1993 | Igarashi et al. ........... 525/58 |
| 5,380,571 A | * | 1/1995 | Ozawa et al. ............ 428/36.9 |
| 5,523,350 A | | 6/1996 | Venkataswamy et al. ... 525/109 |
| 6,068,026 A | * | 5/2000 | Garois ................. 138/126 |

FOREIGN PATENT DOCUMENTS

| JP | 02035290 A | * | 2/1990 |
| JP | 04100859 A | * | 4/1992 |

* cited by examiner

*Primary Examiner*—Harold Pyon
*Assistant Examiner*—Sandra M. Nolan
(74) *Attorney, Agent, or Firm*—Nancy T. Krawczyk

(57) ABSTRACT

The present invention relates to a composite flexible hose, preferably for use in automotive air conditioning systems, with improved thermal resistance. The hose consists of an innermost core layer, a friction rubber layer, an intermediate reinforcement layer, and an external cover layer. The innermost layer is a non-plasticized polyamide mixed with a minor portion of polyolefin corresponding to the main rubber constituent of the friction coat layer. The friction coating is formed of a rubber composite of two EPDM rubbers at a weight ratio of 50/50 and 75 parts by weight of carbon black. The intermediate fibrous reinforcement layer is formed of aramid. The external layer is an acrylate rubber comprising a blend of two ethylene acrylates at a weight ratio of 50/50 and 80 parts by weight of carbon black.

8 Claims, No Drawings

AIR CONDITIONING HOSE

TECHNICAL FIELD

The disclosed invention is directed toward an air conditioning hose. Specifically, the disclosed invention is an automotive air conditioning hose capable of withstanding high temperature fluid flow of up to at least 150° C. therein.

BACKGROUND OF THE INVENTION

Hoses have been developed which are useful for automobile air conditioners, wherein hoses or other suitable flexible conduit members are employed for the purpose of joining the principal operating components of the refrigerating device. These hoses should have good flexibility, high strength, the ability to bend to small radii without kinking, small outside diameter in relation to inside diameter and impermeability to the fluids involved. In addition, these refrigeration hoses are subjected to temperature extremes in under-the-hood applications, and further, must meet requirements for proper coupling attachment.

Prior art automotive air conditioner hoses employ a three-layer structure. The innermost tubular layer of the hose is typically formed of an elastomeric material intended to keep the refrigerant fluid and compressor lubricant in the hose and moisture and air out. A layer of reinforcing braiding is wound upon the outside surface of the inner tube. An outer layer of elastomer resistant to ozone, engine oil and other contaminating materials likely to be present in the engine compartment is typically extruded over the braided reinforcement. In hoses of this type, the inner layer is acrylonitrile-butadiene rubber or chlorosulfonated polyethylene, the braiding fibers may be rayon and other conventional fibers, and the outer layer is neoprene or EPDM.

Even though numerous refrigerant hose designs have been developed, they fail to combine low Freon permeability, low water permeability, high flexibility, vibration resistance and good coupling properties to the hose over temperature extremes.

Conventional hoses, due to the thickness and a corresponding lack of flexibility, provide little noise damping. The noise generated can be detected within the passenger cabin of the automobile. It is desired by the automotive industry to reduce cabin noise as much as possible to provide a quiet ride. The more flexible the hose is, the greater is the noise damping effect of the hose. The present invention is directed toward a hose with greater flexibility and thus greater noise dampening.

The normal operating temperatures encountered by air conditioning hose assemblies employed in automotive air conditioning generally ranges from about −30° to about 120° C. Design specifications require that such hose assemblies operate equally well at temperature ranges of about −40° to 150° C. The higher temperatures are due mainly to the location of the system proximate the engine as well as from the heat generated in compressing the refrigerant as a gas.

U.S. Pat. No. 4,633,912 discloses a composite hose for Freon gas, comprising a polyamide core tube, an elastic friction layer having the specific composition and being directly provided on a core tube, a first reinforcement strand layer, an adhesive barrier friction layer, a second reinforcement strand layer, and then a cover layer. The elastic friction layer provided directly on the core tube comprises (a) a base rubber selected from EPDM, a copolymer of butadiene, polychloroprene, polybutadiene, polyisoprene or a mixture thereof, (b) a calcium ion source, (c) resorcinol or a phenol-based adhesive system, and (d) a peroxide or a sulfuric vulcanizing agent. The calcium source (b) is said to make better adhesion to a polyamide of the core tube. The adhesive barrier friction layer being present between the first and second reinforcement strand layers is provided to minimize a friction of the strands, and is made of a copolymer of ethylene and acrylic acid. For the cover layer, a halogenated butyl rubber containing bis-dienophile as a crosslinking agent is used.

U.S. Pat. No. 5,488,974 discloses a composite hose for automotive air conditioning systems. The hose consists of the innermost layer, the intermediate rubber layer, a fibrous reinforcement layer and an external rubber layer, each of which is formed in this order from the inside. The innermost layer is formed of a modified polyamide obtainable by blending of a polyamide and a carboxyl-containing modified polyolefin, and the intermediate rubber layer is formed of a rubber composition obtainable by a blend of 10 to 50 parts by weight of silicic acid or a salt thereof and 5 to 15 parts by weight of a brominated alkylphenol formaldehyde resin per 100 parts of the rubber material obtainable by blending butyl rubber and a halogenated butyl rubber at a weight ratio of 50/50 to 0/100.

SUMMARY OF THE INVENTION

The disclosed invention is a hose, preferably for use in automotive air conditioning units. The four layer hose exhibits high flexibility, high gas impermeability, and a resistance to high temperatures within the range of 150° C.

The present invention discloses a hose comprising an innermost core layer comprised of non-plasticized polyamide; an intermediate reinforcing layer comprised of aramid fibers, and an outermost layer of acrylic rubber compound.

A further aspect of the disclosed invention includes a friction coat rubber layer disposed between the innermost core layer and the intermediate reinforcing layer, the friction coat layer comprised of ethylene propylene diene rubber and 75 parts by weight of carbon black.

A further aspect of the disclosed hose is the friction coat rubber is a 50/50 weight percent blend of two ethylene propylene diene rubbers, the two rubbers having differing Mooney viscosities.

The disclosed invention further discloses an automotive air conditioning hose with an innermost layer, a friction coating layer, an intermediate reinforcing layer, and an outermost layer, wherein 1) the innermost layer is comprised of non-plasticized nylon-6 blended with an EPDM rubber at a weight ratio of 95/5 to 85/15; 2)the friction coat layer is comprised of a 50/50 weight percent blend of two EPDM rubber with differing Mooney viscosities, and 75 parts by weight of carbon black; 3) the intermediate reinforcing layer is comprised of adhesively treated aramid fibers; and 4)the outermost layer is comprised of a 50/50 weight percent blend of two ethylene acrylates with differing Mooney viscosities, and 80 parts by weight of carbon black.

DETAILED DESCRIPTION OF THE INVENTION

The hose of the present invention is comprised of a core tube. The core tube is formed from a selected resin, with high impermeability against the fluid which flows therein. The core tube is provided with an outer friction layer, selected for its adhesion ability to the core tube and the adjacent reinforcement layer. The reinforcement layer is comprised of a strand which provides a high flex dynamic performance. The outermost layer of the tube is a thermoplastic rubber layer.

The core layer of the hose is a resin polyamide. Polyamide resin is preferred as providing a good balance between impermeability and flexibility. To provide adhesion to the friction coat layer, the polyamide resin may be formed of a blend material consisting of polyamide resin and a polyolefin rubber material. For the improved adhesion to the friction coat layer, the polyolefin selected should be selected from among the main rubber constituents of the friction coat layer. The weight ratio of polyamide to polyolefin ranges from 95/05 to 85/15. Nylon-6 is preferable as the selected polyamide resin, with a 6% blend of ethylene propylene diene rubber, corresponding to the preferred composition of the friction coat layer. Other conventional nylons, such as nylon 66, nylon 11, were determined to not be able to provide the required adhesion in combination with the needed flexibility and impermeability as the nylon 6.

Additionally, the polyamide resin is non-plasticized. The core may be formed by conventional methods, such as extrusion. While conventionally, a non-plasticization of the resin would result in a tube of higher bending strength and lower flexibility, the effects are mitigated by optimizing the thickness of the inner tube.

The thickness of the differing layers of the hose is linked to the desired characteristics, as excessively thin wall thicknesses or excessively thick wall thicknesses present flexibility or kinking problems or coupling compatibility problems of the final hose composite. For every thousandths of a centimeter increase in the thickness of the hose, the flexibility of the hose decreases. For hoses with an inside diameters (ID) of 13 mm and an outside diameter (OD) of about 19.5 mm, the ID of the hose has a maximum value of 13.46 mm and a minimum value of 12.44 mm, while the OD has a maximum value of 19.9 mm and a minimum value of 18.9 mm. The wall thickness of the hose is within the range of 2.72 mm and 3.73 mm. But, as every incremental thickness of the hose decreases the desired properties of the hose, the smallest wall thickness, without a loss of impermeability and creation of kinking problems, is preferred. The preferred wall thickness for a 13 mm ID hose, in accordance with the disclosed invention, is about 3.17 mm.

The wall thicknesses of the polyamide core is within the range of 0.14 to 0.16, with a preferred thickness of 0.15 mm, for a 13 mm ID hose. This thickness provides the required flexibility without kinking. One skilled in this art will appreciate that for other size hoses, the wall thickness for the polyamide core may differ, yet still provide the necessary flex, impermeability and freedom from kinking.

Radially outward of the nylon innertube is an elastomeric friction layer. One skilled in this art will appreciate that the elastomeric friction layer may be applied in the form of a sheet either spirally wrapped or butt seamed. These methods of applying such layers are known in the art, and variations thereof are contemplated herein.

The elastomeric friction layer is comprised of a base polymer of ethylene propylene diene rubbers (EPDM). Suitable EPDM's are ethylene propylene norbornene terpolymers, ethylene propylene-1,4-hexadiene terpolymers, ethylene propylene dicyclopentadiene terpolymers and the like. The friction layer also contains an adhesive system and a curative.

The peroxide curative useful in the elastomeric friction layer are those that are normally used in such base stocks. For example peroxides such as dicumyl peroxide, α-α-bis(t-butylperoxide)diisopropylbenzene, benzoyl peroxide, 2,4-dichlorobenzoyl peroxide, 1,1-bis(t-butylperoxy)3,3,5-trimethylcyclohexane, 2,5-dimethyl-2,5-bis(t-butylperoxy) hexane, 2,5-dimethyl-2,5-bis(t-butylperoxy)hexyne-3, and n-butyl 4,4-bis(t-butylperoxy)valerate. The most preferred and commercially available peroxide curatives are Percadox TM 14/40 from Noury Chemical Corporation and Vul-Cup TM from Penwalt Corporation. From 1 to about 10 parts of peroxide are utilized based on 100 parts of base polymer. Peroxides are preferred as the curative since they are less sensitive to premature resin formation.

The adhesive systems useful in this invention are the conventionally known adhesive systems for use with peroxide cured elastomers. For example, maleinized 1,2-polybutadiene resin.

The friction layer composition may also contain various additives in conventional or suitable amounts. Such additives may include, and are not limited to, retardants to prevent an unduly quick cure, antioxidants, processing aids, reinforcing agents such as carbon black, silica, and the like, and various plasticizers.

The thickness of the friction layer, for 13 mm ID hoses, is optimized at a thickness ranging from about 1.000 to 1.020 mm, with a preferred thickness of 1.016 mm. One skilled in this art will appreciate that for other size inside diameter hoses, the wall thickness for the friction layer may vary, yet still provide the necessary adhesion characteristics.

Outward of the friction barrier layer is a reinforcement layer. The reinforcement layer may be comprised of spirally wound reinforcement strands, laid under sufficient tension to improve the strength of the hose structure. Alternatively, the reinforcement layer may be a braided layer. The reinforcement strands are laid at angles such that flexing of the hose will not result in collapse or kinking. An angle such as 52° to 56° with respect to the centerline of the hose has been found acceptable. Most preferably, a neutral angle of 54° 44' or below has been found advantageous for the spiral wraps.

To provide the inventive hose with excellent strength and flexibility, a reinforcement strand with high flex dynamic performance is desired. Herein the reinforcement strands are adhesively treated aramid fibers.

The thickness of the reinforcement layer is dependent upon the strand thickness. To achieve the desired overall thickness of the hose, the reinforcement layer has a thickness of about 0.625 to about 0.645 mm, with a preferred width of 0.635 mm for the 13 mm ID hose.

The outermost cover layer is placed on the outside of the hose construction. The cover layer is an acrylic rubber compound. Desired for the present invention are various terpolymers of ethylene, acrylate, and unsaturated carboxy acids having from 3 to 10 carbon atoms or combinations thereof. The acid, preferably, is acrylic acid or methacrylic acid. The terpolymers contain at least 50 mole percent of ethylene, generally from about 0.5 to about 10 mole percent of the acid, and about 10 to about 49.5 mole percent of the alkyl acrylate.

The selected terpolymer or combination of terpolymer is combined with a curative. Suitable curatives or accelerators include salts of fatty acids. Additional curatives may be added.

The cover layer composition of the present invention may also contain various additives in conventional or suitable amounts. Such additives may include, and are not limited to, retardant to prevent an unduly quick cure, antioxidants, processing aids, colorants or pigments, reinforcing agents such as carbon black, silica, and the like, various flame retardants, and various plasticizers.

The preferred cover thickness for the 13 mm ID tube ranges from 1.35 to 1.45 mm, with an preferred thickness of about 1.37 mm. One skilled in this art will appreciate that for other size hoses, the wall thickness of the various layers of the disclosed hose may vary, while maintaining the desired characteristics in order to provide a highly flexible tube.

The invention will be better understood by reference to the following example which serves to illustrate but not to limit the scope of the present invention.

EXAMPLE

A 13 mm ID tube was prepared with the following noted layers. An inner core from nylon 6 with a 6% blend of EPDM was formed. The inner core has a thickness of 0.15 mm. A friction coating, with a composition as set forth in Table 1, was applied to the outerside of the inner core. The friction coating layer has a thickness of about 1.016 mm.

An aramid reinforcing layer, with a thickness of about 0.635 mm, was applied in any conventional manner, to the outerside of the friction coat layer. The aramid reinforcing fibers have been treated with an iso-cyanate treatment for improved adhesion and flex dynamic performance.

Outward of the reinforcing layer is the acrylate coating, with a composition as set forth in Table 2. The cover layer has a thickness of about 1.37 mm. The disclosed acrylate composition provides a high temperature resistance to the hose, as well as excellent static and dynamic performance.

TABLE 1

| Friction Coating | |
|---|---|
| EPDM[1] | 50.00 |
| EPDM[2] | 50.00 |
| Polychlorprene[3] | 4.00 |
| Carbon Black[4] | 75.00 |
| Plasticizer[5] | 10.00 |
| Zinc oxide | 10.00 |
| Bonding Agent[6] | 10.00 |
| Curative[7] | 6.00 |

[1]Mooney visc. (ml, 125° C.) = 27; Nordel 2722 by DuPont Dow
[2]Mooney visc. (ml, 125° C.) = 25; Nordel 2522 by DuPont Dow or R.T. Vanderbilt
[3]Mooney visc. (ml, 1 ± 4, 212° F.) = 40-49; Neoprene W by DuPont or R.T. Vanderbilt
[4]N762, Iodine No. 27, DBP 65
[5]Paraffinic oil, ASTM D2226, Type 104B, Aromatics 24%; Sunpar 2280 by Sun Refining
[6]Maleinized 1,2-Polybutadiene Resin
[7]α-α-bis(t-butylperoxy) diisopropylbenzene; peroxide; Vul-Cup 40KE by Hercules

TABLE 2

| Cover Layer | |
|---|---|
| Ethylene acrylate[8] | 50.00 |
| Ethylene acrylate[9] | 50.00 |
| Carbon Black[10] | 80.00 |
| Antioxidant and Inhibitor[11] | 2.00 |
| Stearic Acid | 1.50 |
| Stearmaide | 0.50 |
| Fatty Acid Salt[12] | 1.00 |
| Plasticizer | 5.00 |
| Processing agent | 2.50 |
| Accelerator[13] | 4.00 |

[8]Mooney viscosity (100° C.) = 16; Vamac G by DuPont
[9]Mooney viscosity (100° C.) = 35; Vamac HG by DuPont
[10]N550; Iodine No. 43, DBP absorption No. 121; Continex N550 by Continental Carbon
[11]4,4'-bis(α al<, -dimethlylbenzyl)diphenylamine; Naugard 445 by Uniroyal Chemical
[12]organic phosphate ester free acid; Vanfre VAM by R.T. Vanderbilt
[13]diorthotolyl guanidine The disclosed, exemplary hose exhibits excellent temperature resistance, up to 150° C., high static and dynamic performance, and high noise dampening. While we have shown and described embodiments of our invention, it is to be understood that it is capable of many modifications. Changes therefore in the construction and particulars may be made without departing from the scope of the invention as defined and claimed.

What is claimed is:

1. A hose comprising an innermost layer, a friction coat layer, an intermediate reinforcing layer, and an outermost layer, characterized in that:

the innermost layer is comprised of non-plasticized polyamide;

the friction coat layer is comprised of a 50/50 weight percent blend of two ethylene propylene diene rubbers, the two rubbers having differing Mooney viscosities, and 75 parts by weight of carbon black the intermediate reinforcing layer is comprised of aramid fibers; and the outermost layer is comprised of a blend of two ethylene acrylic rubbers with differing Mooney viscosities.

2. The hose of claim 1 wherein the non-plasticized polyamide is a blend of polyamide and polyolefin rubber with a weight ratio of polyamide and polyolefin rubber of 95/05 to 85/15.

3. The hose of claim 2 wherein the polyolefin rubber is ethylene propylene diene.

4. The hose of claim 1 wherein the ethylene acrylic rubber layer is comprised of a 50/50 weight percent blend of the two differing ethylene acrylic rubbers, and 80 parts by weight of carbon black.

5. A hose consisting of an innermost layer, a friction coating layer, an intermediate reinforcing layer, and an outermost layer, characterized by:

the innermost layer is comprised of non-plasticized nylon-6 blended with an ethylene propylene diene rubber at a weight ratio of 95/5 to 85/15;

the friction coat layer is comprised of a 50/50 weight percent blend of two ethylene propylene diene rubbers with differing Mooney viscosities, and 75 parts by weight of carbon black;

the intermediate reinforcing layer is comprised of adhesively treated aramid fibers; and the outermost layer is comprised of a 50/50 weight percent blend of two ethylene acrylic rubbers having differing Mooney viscosities, and 80 parts by weight of carbon black.

6. The hose of claim 5 where the weight ratio of nylon-6 to EPDM rubber is 94/6.

7. The hose of claim 1 wherein the outermost layer is peroxide cured.

8. The hose of claim 5 wherein the outermost layer is peroxide cured.

* * * * *